United States Patent [19]
Reed et al.

[11] B 3,987,934

[45] Oct. 26, 1976

[54] VOLUME SETTING MECHANISM FOR FLUID DISCHARGE DEVICES

[75] Inventors: Richard Dean Reed, San Jose; Doud Roger Branham, Redwood City, both of Calif.

[73] Assignee: Oxford Laboratories Inc., Foster City, Calif.

[22] Filed: Aug. 16, 1974

[21] Appl. No.: 497,853

[44] Published under the second Trial Voluntary Protest Program on February 17, 1976 as document No. B 497,853.

[52] U.S. Cl. .................................. 222/43; 222/44; 222/309
[51] Int. Cl.² .......................................... G01F 11/06
[58] Field of Search .................. 222/43, 44, 46, 49, 222/50, 41, 309

[56] References Cited
UNITED STATES PATENTS

| | | | |
|---|---|---|---|
| 1,581,298 | 4/1926 | Schotthoefer | 222/43 X |
| 2,776,075 | 1/1957 | Etter | 222/43 |
| 2,985,339 | 5/1961 | Fischer et al. | 222/44 |
| 3,176,876 | 4/1965 | Fischer et al. | 222/44 |
| 3,452,901 | 7/1969 | Roach | 222/49 |

FOREIGN PATENTS OR APPLICATIONS

| | | | |
|---|---|---|---|
| 905,949 | 9/1962 | United Kingdom | 222/43 |

*Primary Examiner*—Robert B. Reeves
*Assistant Examiner*—Charles A. Marmor
*Attorney, Agent, or Firm*—Limbach, Limbach & Sutton

[57] ABSTRACT

A device for accurately dispensing a volume of fluid that is predetermined by limiting the outward travel distance of a plunger within a fluid chamber. The plunger limit stop is attached to a scale post having raised indicia lines and is adjustable therealong by a detent engagement wherein the limit stop is selectively positioned to engage one of a plurality of notches formed on the scale post between its volume indicia raised lines.

2 Claims, 5 Drawing Figures

VOLUME SETTING MECHANISM FOR FLUID DISCHARGE DEVICES

BACKGROUND OF THE INVENTION

This invention is an improvement over the liquid dispensing device disclosed in U.S. Pat. No. 3,452,901, granted July 1, 1969. In this prior patent, which is expressly incorporated herein by reference, a liquid dispensing device is provided for mounting on liquid jars wherein a plunger is manually movable out of and into a liquid pump chamber from the top of the jar in order to discharge liquid therefrom. An adjustable stop is provided to limit plunger movement out of the pump chamber. A graduated liquid volume scale is provided to permit adjustment of the stop to a desired volume of liquid to be discharged in one full stroke of the plunger.

Although such a liquid dispensing device has been very satisfactory, it does require some operator judgment in aligning the stop with the desired volume as indicated on the scale since an infinite number of such positions are possible. Therefore, it is a primary object of this invention to provide an improved volume setting device which reduces the amount of operator judgment that is required for accurate volume settings.

SUMMARY OF THE INVENTION

This and additional objects are accomplished by the present invention wherein the indicia markings of the scale post are raised outward on the surface of a scale post in a manner forming notches therebetween. A volume indicator on the movable stop is shaped to be inserted into these notches. An operator thus has a finite number of positive positions with which to set the plunger stop, each setting being carefully calibrated. The result is improved accuracy of liquid discharge of those finite liquid volumes. Any of these volume settings may be selected with repeatability of results.

The improvement of the present invention has only been generally summarized. Additional objects, advantages and features thereof are included in the following description of its preferred embodiment, which description should be taken in conjunction with the accompanying drawings.

DESCRIPTION OF THE PREFERRED EMBODIMENT

Figure 1:
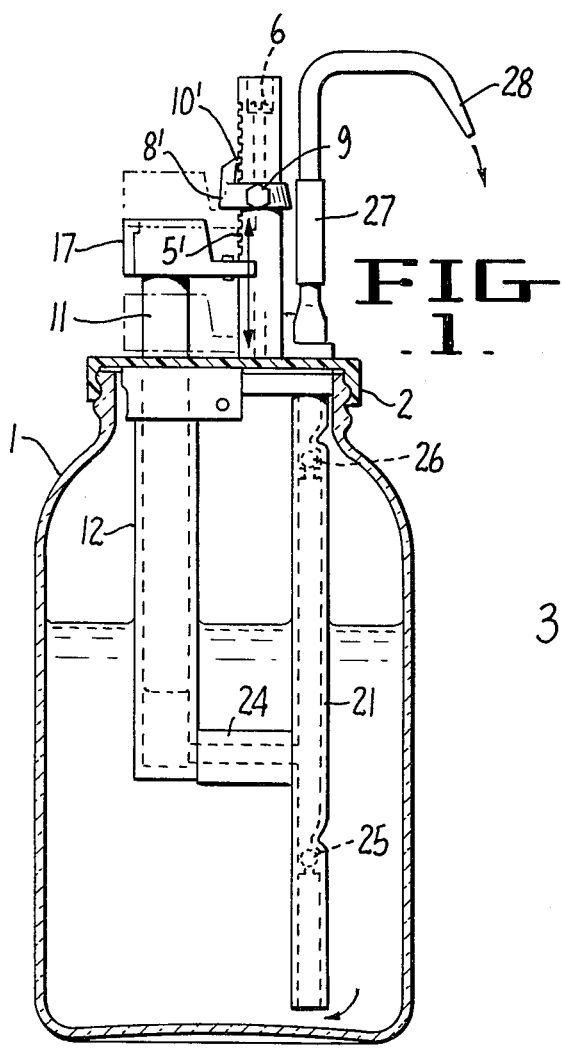
FIG. 1 is a cross-sectional view of a liquid dispenser according to U.S. Pat. No. 3,452,901 positioned on a bottle for use and including the improvement of the present invention.

FIG. 1 shows the environment in which the present invention exists and is substantially the same as FIG. 1 of aforementioned U.S. Pat. No. 3,452,901 except that certain unnecessary detail has been omitted and the reference characters as applied to the improved items claimed herein are provided with a prime. Briefly, a glass bottle 1 or other container having a threaded top contains a cap structure 2 threaded thereon. A cylindrical barrel 12 forms a piston chamber in which a plunger 11 is slidably held with one end thereof existing in the cylinder and the other end thereof having an operating handle 17 attached thereto. When the plunger 11 is withdrawn from within the bottle 1, liquid is drawn in through the valve 25 to the barrel 12. As the plunger 11 is depressed into the bottle, liquid is forced out of the barrel 12 through the valve 26 and out of a liquid delivery tip 28.

An operator depresses the knob 17 as far as possible, until it abuts the top of the cap 2, when discharging liquid from the tip 28. Therefore, the volume of liquid dispensed depends upon how far the plunger 11 was withdrawn from the barrel 12 before such depression began. In order to control the beginning position of the knob 17 and thus the plunger 11, a scale post 5' is attached to the cap 2 and extends upwardly adjacent the path taken by the knob 17 as the plunger 11 is moved into and out of the barrel 12. The post 5 is rigidly attached by a screw 6 to the cap 2. An indicator stop member 8 is held by the scale post 5' and may be moved up and down by hand along a graduated volume scale 7'. A screw 9 provides a means to rigidly attach the stop member 8' to the scale post 5'. A pointer 10' marks on the scale 7' the volume of liquid that will be discharged from the tip 28 upon full depression of the knob 17 from abuttment on the underside of the stop member 8'.

Figure 2:
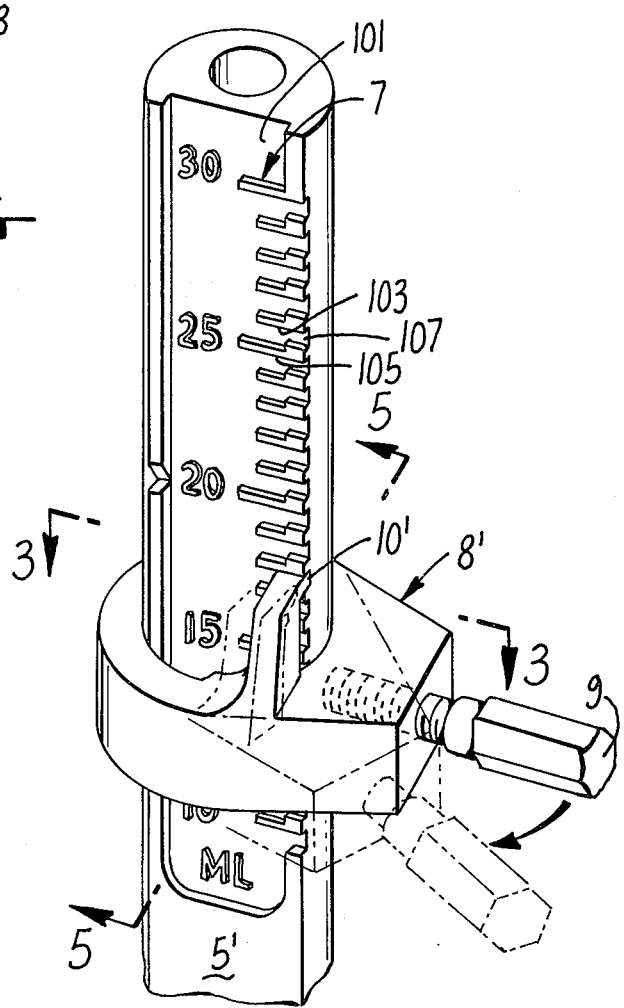
FIG. 2 is an enlarged perspective view of the improved adjustment mechanism of the liquid dispenser of FIG. 1.
Figure 5:
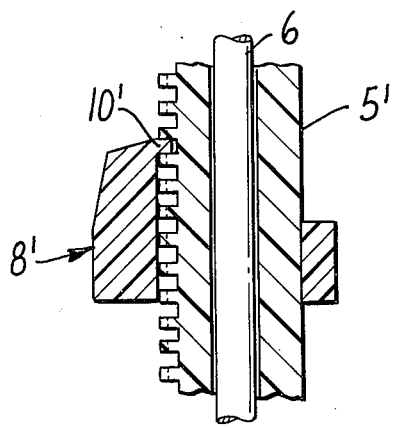
FIG. 5 is a sectional view of FIG. 2 taken across section 5—5 thereof.

The scale post of the previous dispenser design as illustrated in aforesaid U.S. Pat. No. 3,452,901 is substantially smooth with its stop member being substantially nonrotatable about the scale post. The improvement of the present invention, on the other hand, is constructed on plane surface 101 of an otherwise cylindrically shaped scale post 5'. Indicia marks along the length of the plane surface 101, such as the marks 103 and 105, for example, are not merely printed on the surface 101 as herein before but rather are raised outward therefrom a sufficient distance to form notches therebetween, such as the notch 107. The pointer 10' is shaped for reasonably tight engagement into each of these notches, as best illustrated in FIGS. 2 and 5. This structure thus permits an operator to select one of a finite number of volumes by inserting the indicator 10' into an appropriate one of the notches along the height of the scale post 5'. The co-operating shape between the notches, such as the notch 107, and the indicator 10' securely holds the stop member 8' at one of these finite locations against movement along the scale post 5'.

The raised indicia lines, such as the lines 103 and 105, are parallel to one another extending from an edge of the plane surface 101. The portion of these indicia lines immediately adjacent the edge is thickened for strength since the indicator 10' is forced thereagainst to some extent when being inserted into notches formed by these thickened portions. Numerical indications of volume are also provided on the surface 101 at some of the raised indicia lines, as shown best in FIG. 2.

Figure 3:
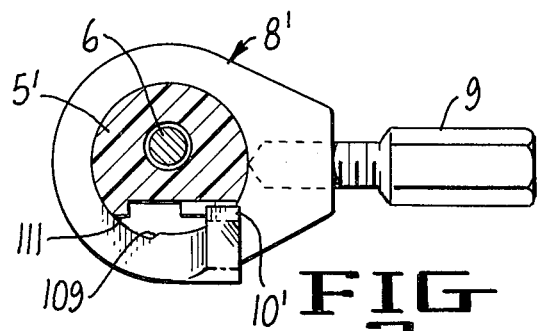
FIG. 3 is a sectional view of the improvement of FIG. 2 taken across line 3—3 thereof.
Figure 4:
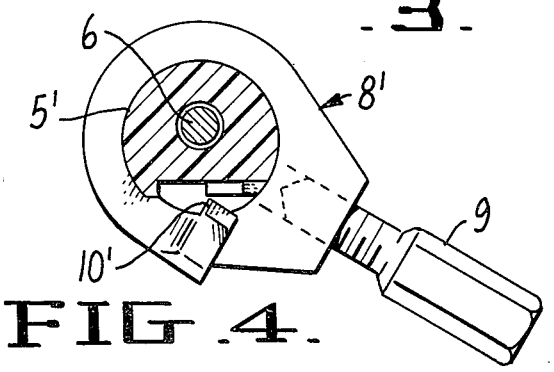
FIG. 4 is the same view as FIG. 3 with the parts thereof having a different relative position.

The stop member 8' is made to be rotatable with respect to the scale post 5' in order to permit disengagement of the indicator 10' from a notch and movement thereof to some other notch. The inside surface of the stop member 8' is generally circular corresponding to the circular shape of the scale post 5' in a plane perpendicular to its longitudinal axis. An exception, however, is a discontinuity 109 which is seen best in FIG. 3. This discontinuity positioned to engage an edge 111 of the scale post 5' with the indicator 10' at a position outside of the notches, as shown in FIG. 4, so that the stop member 8' may be slid up and down the scale post 5'. A thumb screw 9 is threadedly attached through an aperature of the stop member 8' to provide a latching of the stop member 8' against rotation, as shown in FIG. 3.

Besides the advantage of having a finite member of very precise volumes that are setable by the improvement of the present invention, an operator may, if desired, chose some other volume setting in between the positions provided. By rotating the stop member 8 to the position shown in FIG. 4 and in dotted outline in FIG. 2, any position may be assumed along the scale post 5'. When the stop member 8 has been moved so that the indicator 10' is at the desired indicia mark of the scale post 5', the screw 9 may be clamped against the post 5' to hold the stop member 8' in position.

It will be understood that although a specific embodiment of the present invention has been described, that the present invention will be accorded its full protection within the scope of the appended claims. Particularly, this improvement has applications in other fluid dispensing devices where improved accuracy and reduced human error in setting the volumes of fluid to be displaced are desired.

We claim:
1. In a fluid dispensing device that comprises:
a barrel forming a fluid chamber,
a plunger positioned with one end extending into said barrel and another end remaining outside of said barrel,
an operating handle attached to the plunger at its outside end,
means permitting fluid to be drawn into said chamber when the plunger is moved in a direction out of the chamber and permitting fluid to be discharged when the plunger is moved in an opposite direction into said chamber,
an elongated scale post held fixed with respect to said barrel, and characterized by a uniform shape along at least a portion thereof in a cross-section perpendicular to its length, said shape including a circular portion joined by substantially a straight line, thereby to form a substantially flat portion along its length, said scale post further including along said substantially flat portion a plurality of indicia lines arranged parallel to one another and perpendicular to the length of the post in a row,
a stop surrounding said post with a circular interior surface shape in cross-section that is complementary to the outside post shape and movable along the length of said post and selectively attachable thereto, said stop being positioned to abut said handle as the plunger is moved outward of said barrel, said stop additionally having a pointer that moves from one parallel indicia line to another as the stop is moved along the length of said scale post, and
means for selectively fastening said stop to said scale post against movement therealong at desired positions corresponding to a desired plunger fluid volume;
the improvement comprising:
said indicia lines being raised above said substantially flat portion of said scale post in a manner to form notches therebetween,
said pointer being shaped for insertion into any of said notches in a manner to hold said stop from movement along the length of said scale post, and said stop being rotatable about said scale post at least from an extreme position wherein said pointer is fully nested within the desired position of one of said notches to at least a second extreme position wherein said pointer clears said raised indicia lines to permit movement of said stop along the length of said scale post,
whereby the volume of fluid dispensed by said device is accurately set by positive detent engagement.

2. The improved device according to claim 1 which additionally comprises:
an inner projection on the interior surface of said stop which provides a limit of rotation of said stop about the scale post so that its pointer just clears the raised indicia lines for movement of the stop along the length of the scale post, and wherein
said selective fastening means also functions to hold said stop against rotation with respect to said scale post, whereby the stop may be selectively positioned by hand to a desired fluid volume as indicated by said indicia lines on the scale post and fastened thereto for subsequent operation of said plunger.

* * * * *